R. A. PALMER.
MOTOR VEHICLE FRAME.
APPLICATION FILED MAR. 24, 1917.
1,261,603.
Patented Apr. 2, 1918.
2 SHEETS—SHEET 1.
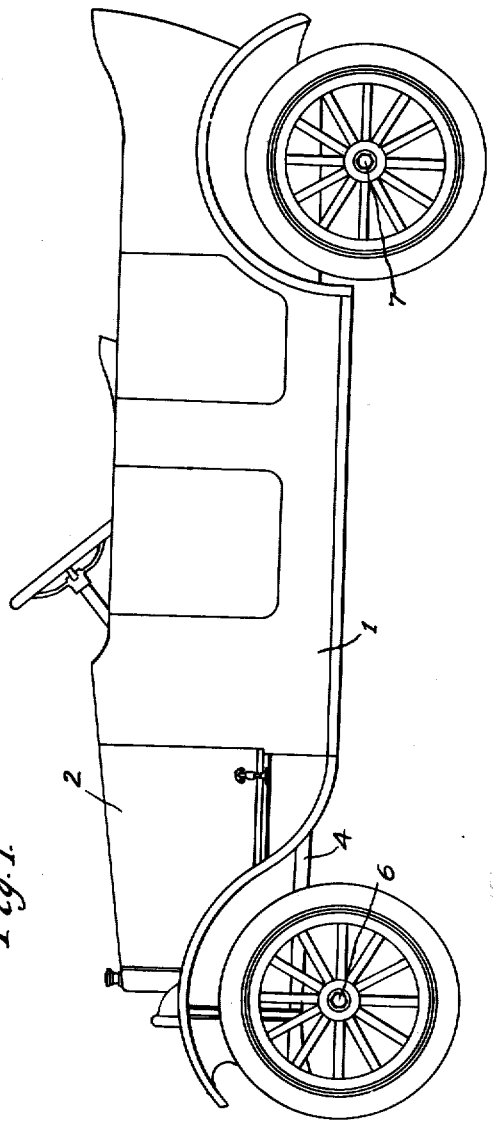
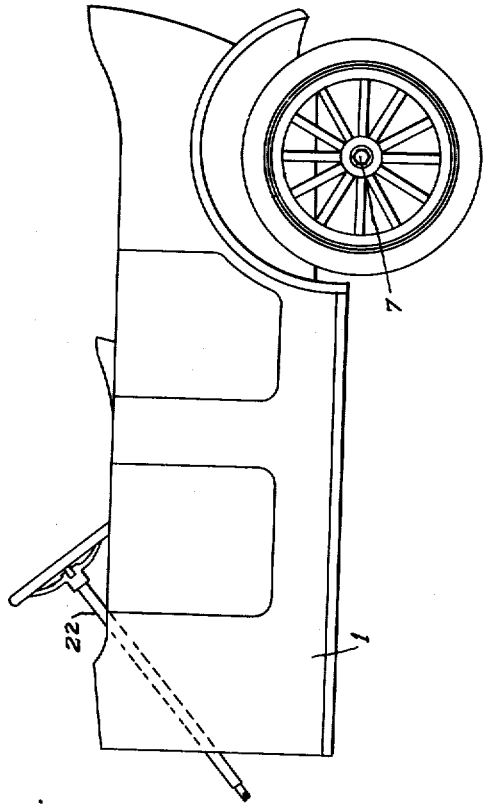
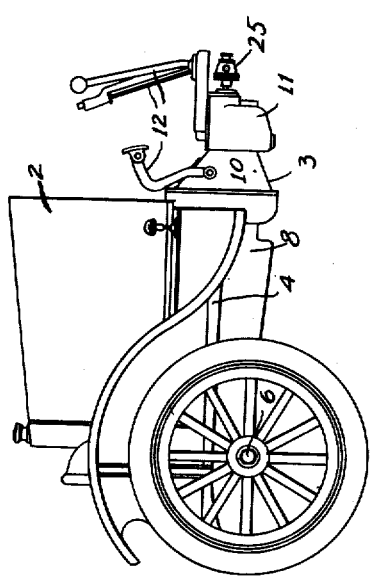
INVENTOR
Randall A. Palmer.
ATTORNEY R. A. PALMER.
MOTOR VEHICLE FRAME.
APPLICATION FILED MAR. 24, 1917.
1,261,603.
Patented Apr. 2, 1918.
2 SHEETS—SHEET 2.
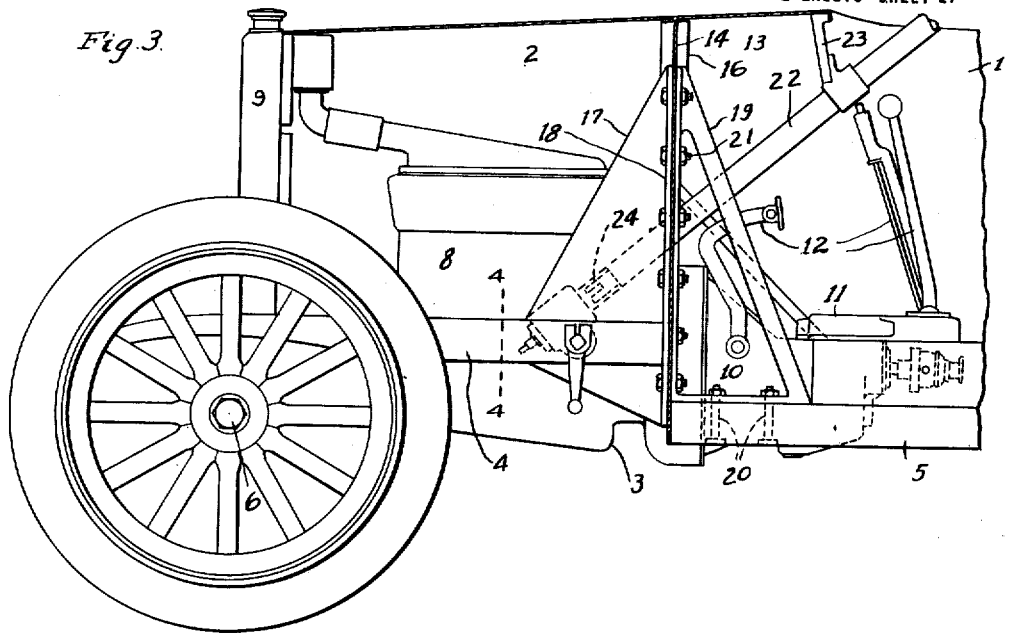
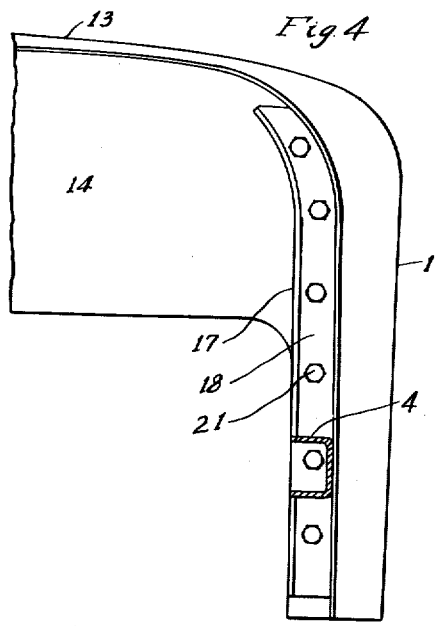
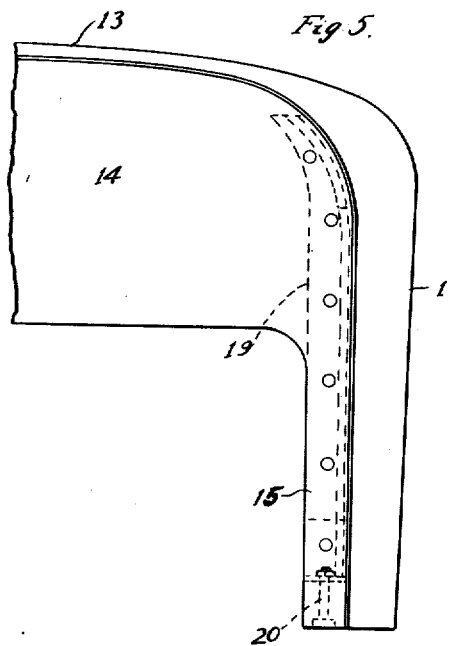
INVENTOR
Randall A. Palmer
BY
B. P. Wheeler
ATTORNEY

UNITED STATES PATENT OFFICE.

RANDALL A. PALMER, OF PONTIAC, MICHIGAN, ASSIGNOR TO OLYMPIAN MOTORS COMPANY, OF CHICAGO, ILLINOIS, A CORPORATION OF DELAWARE.

MOTOR-VEHICLE FRAME.

1,261,603.     Specification of Letters Patent.     Patented Apr. 2, 1918.

Application filed March 24, 1917. Serial No. 157,178.

*To all whom it may concern:*

Be it known that I, RANDALL A. PALMER, a citizen of the United States, residing at Pontiac, in the county of Oakland and State of Michigan, have invented a new and useful Motor-Vehicle Frame, of which the following is a specification.

This invention relates to motor vehicles, and more particularly to the construction of the frames of such vehicles.

It is the object of the invention to provide a frame construction for automobiles which will facilitate the storing, transportation and repairing of the parts of the vehicle by making the frame thereof in two readily reparable sections, one forming an assembly with the power plant and front portion of the running gear, and the other forming a separate assembly with the body and rear portion of the running gear of the vehicle. The two sections are adapted for detachable connection at such point intermediate the ends of the frame sections as will utilize available space in which to mount the bracings necessary to insure rigidity and at the same time conceal the joint in a manner not to alter or mar the normal lines or exterior appearance of the body of the vehicle.

An embodiment of the invention accomplishing the above object is described in the following specification and illustrated in the accompanying drawings, wherein:

Figure 1 is a view in side elevation of a motor vehicle embodying the novel features which constitute the present invention.

Fig. 2 is a similar view in which the two separable assemblies are shown in a detached relation.

Fig. 3 is a view in side elevation of the front portion of the motor vehicle, showing the means for detachably connecting the two sections of the frame, the hood and dash being shown in section.

Fig. 4 is a fragmentary sectional view on line 4—4 of Fig. 3, disclosing a portion of the means for connecting the frame sections.

Fig. 5 is a front view of one side portion of the rear assembly.

Referring now more particularly to the drawings, wherein like reference characters designate similar parts in all the views, 1 denotes the body of a motor vehicle, 2 the hood thereof, 3 the power-plant, 4 and 5 front and rear separable frame sections, and 6 and 7 the front and rear axles respectively.

The term power-plan as here used includes primarily an engine 8, a radiator 9, clutch and transmission mechanisms respectively incased at 10 and 11, and controlling means 12 for said mechanisms. The body 1 is formed at the front thereof with a cowl portion 13, and the rear edge portion of the hood is adapted to overlap and rest upon the front edge portion of said cowl, as is best seen in Fig. 3. Within the cowl portion of the body, adjacent the front edge of said portion, there is disposed a dash 14, preferably of sheet metal. This dash is formed at its ends with depending portions or legs 15, respectively in proximity to the sides of the body. Rigid connection between the dash and body is established by flanging the dash rearwardly at its top and at the outer edges of the legs 15, as indicated at 16, and welding or otherwise rigidly fastening the flange to the body.

The rear end portions of the rails of the front frame section 4 respectively carry brackets 17, each having a vertically extending lateral flange 18 contiguous with the adjacent leg 15 of the dash. The body portion of each of these brackets has the form of a substantially triangular web cut away in its bottom portion to receive the corresponding supporting rail, the portions of said web above and below the rail being welded or otherwise rigidly secured thereto. Another pair of triangular brackets 19 are mounted respectively upon the front end portions of the sills of the rear frame section 5, said brackets having horizontal bottom portions which are bolted to the frame section 5 at 20, and vertical portions contiguous with the legs 15 of the dash. A series of bolts 21 are passed through the flanges 18, the legs 15 and the vertical portions of the brackets 19, establishing a rigid connection between the front and rear sections of the frame, and clamping the dash firmly between said brackets.

The steering column 22 has its upper portion loosely engaged by a bracket 23 depending rigidly from the cowl 13, and the lower extremity of said column has an interlocking telescopic engagement with the steering mechanism, as is indicated at 24.

From the foregoing description it will be seen that the front section 4 of the frame, together with the power plant 3 and front portion of the running gear, constitute one assembly; and the body 1, together with the rear section 5 of the frame and the rear portion of the running gear constitute another, and that the brackets 17 and 19 and the bolts 20 and 21 establish a rigid detachable connection between the two sections of the frame. To disconnect said sections it is necessary only to slightly elevate the steering column so as to disengage it from operative engagement at 24 with the steering mechanism, disconnect the rear portion of the running gear from the power plant at the universal joint 25, and finally remove the bolts 21. The reverse of these operations will of course be performed in connecting the two frame sections.

The sectional frame construction above described is advantageous to the manufacturer first, in assembling, since the power plant and running gear may be obviously more readily installed upon the separate frame sections than where there is a single frame, and second in the shipping, since the separate assemblies respectively including the two frame sections will form less bulky packages and will be more readily handled than complete motor vehicles. Also when completed motor vehicles are kept in storage the above described construction will be found desirable for like reasons.

The repairing of a motor vehicle such as has been described will be much facilitated by the ready access to the power plant and running gear, resulting from the sectional construction of the frame.

What I claim is:

1. A motor vehicle, comprising two separable assemblies, one including the body of the motor vehicle, a frame section for supporting said body and a rear portion of the running gear, and the other including the power plant, a frame section for supporting the power plant, and the front portion of the running gear, a bracket rigidly surmounting the front frame section at each side of its rear portion, a bracket rigidly surmounting the rear frame section at each side of its front portion, and means rigidly and detachably connecting the adjacent brackets at each side of the frame.

2. A motor vehicle, comprising two separable assemblies, one including the body of the motor vehicle, a frame section for supporting said body and a rear portion of the running gear, and the other including the power plant, a frame section for supporting the power plant, and the front portion of the running gear, a dash rigidly carried by the body, brackets respectively mounted upon the adjacent portions of said frame sections, and means rigidly and detachably engaging said brackets, and clamping the dash between the same.

3. A motor vehicle, comprising two separable assemblies, one including the body of the motor vehicle, a frame section for supporting said body and a rear portion of the running gear, and the other including the power plant, a frame section for supporting the power plant, and the front portion of the running gear, a dash rigidly carried by the body, having depending legs respectively adjacent the sides of the body, brackets respectively rigidly mounted upon adjacent portions of the two frame sections, one at each side of each section, and means rigidly and detachably connecting the brackets at corresponding sides of the two sections, and clamping the corresponding legs of the dash between said brackets.

4. A motor vehicle, comprising two separable assemblies, one including the body of the motor vehicle, a frame section for supporting said body and a rear portion of the running gear, and the other including the power plant, a frame section for supporting the power plant, and the front portion of the running gear, a bracket rigidly surmounting the front frame section at each side of its rear portion, a bracket rigidly surmounting the rear frame section at each side of its front portion, a member transverse of the motor vehicle engaged between the said brackets at each side of the vehicle, and means rigidly and detachably engaging the brackets at each side of the vehicle and clamping said transverse member therebetween.

In testimony whereof I sign this specification.

RANDALL A. PALMER.